Figure 1:
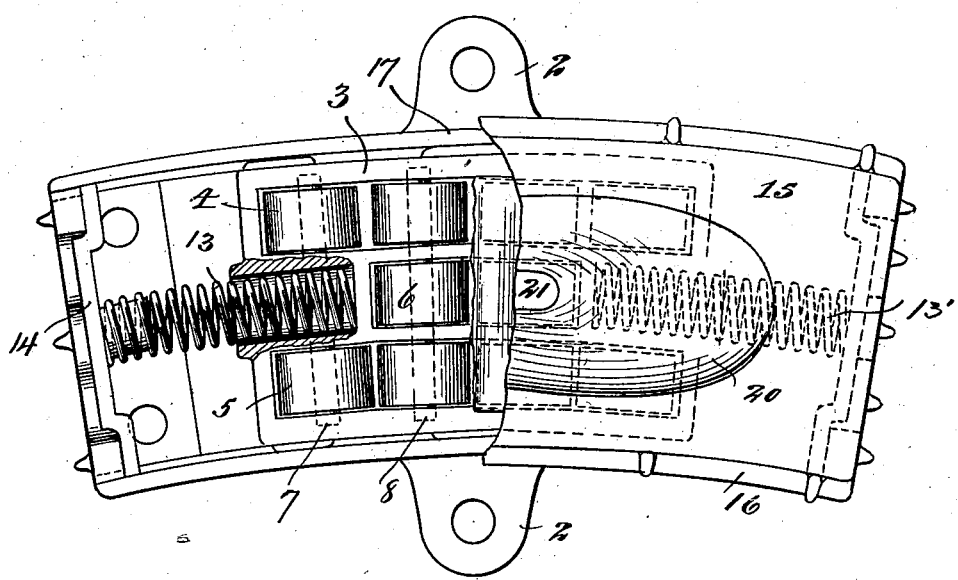

No. 722,995. PATENTED MAR. 17, 1903.
H. D. LAUGHLIN.
SIDE BEARING FOR CARS.
APPLICATION FILED APR. 14, 1902.
NO MODEL.

Witnesses:
Inventor,
Henry D. Laughlin,

# UNITED STATES PATENT OFFICE.

HENRY D. LAUGHLIN, OF CHICAGO, ILLINOIS.

SIDE BEARING FOR CARS.

SPECIFICATION forming part of Letters Patent No. 722,995, dated March 17, 1903.

Application filed April 14, 1902. Serial No. 102,769. (No model.)

*To all whom it may concern:*

Be it known that I, HENRY D. LAUGHLIN, of Chicago, Illinois, have invented certain new and useful Improvements in Side Bearings for Cars, of which the following is a specification.

This invention relates to improvements in side bearings for cars, and refers more specifically to improvements in side bearings of that type wherein a bearing-plate is movably mounted to reciprocate in the direction of the back-and-forth vibration of the car-bolster, which bearing-plate is adapted to take the bearing contact of the car-body.

The chief function of a side bearing is to temporarily take the load of a tilted car and by limiting the contact between the car-body and car-truck to the bearing itself reduce the friction and minimize the resulting strain to both. This tilting occurs while rounding a curve. If the curve is sharp and the speed high, the tilt is often sudden and severe. In such cases the friction is both great and dangerous. It retards the speed of the train, cramps the truck, strains both wheel flange and axle as well as car-body, causes the flange to grind the outside rail, increases the flange wear, and encourages it to climb the rail and jump the track. By taking the load when thrown from center to side and aiding the truck to promptly adjust itself to the curvature of the track the side bearing, if efficient, reduces the strain on the flanges of the wheel, reduces the load of the engine, reduces the friction between flange and rail, reduces the danger of derailment, prevents undue strain of the framework of the car-body, and curtails both rail and flange wear; but to insure the durability and practical success of an antifriction or roller side bearing it is necessary that these heavy and sudden loads be not thrown upon a single roller, but that they be distributed to all at one and the same time. Unless that is done the single roller taking the shock of the whole load will ultimately operate as a punch on the metal in contact or be crushed. To prevent that, as well as to allow or compensate for the varying conditions under which the loads are delivered— conditions produced in car-building, by grades in road-bed, by speed, by bumping, as well as by other causes—this invention is designed, through which the shock of the suddenly-thrown load will be immediately distributed to all the rollers and each relieved of greatly unequal or undue strain.

The salient object of the present invention is therefore to provide a bearing-plate which is capable of reciprocating, as above set forth, and transmits the weight brought thereon to a set of antifriction devices of such construction that the load is distributed over the antifriction devices more uniformly and in such manner as to very greatly lessen the liability of crushing or flattening these antifriction devices, as well as lessen the liability of fracturing the bearing-plate itself.

The salient feature of the invention is capable of embodiment in connection with antifriction-bearings of various types, but is peculiarly adapted to an improved construction of side bearing illustrated herein, which side bearing, so far as its main construction is concerned, forms the subject of a patent granted to Hubert Perry April 23, 1901, No. 672,648.

Inasmuch as said patent above referred to sets forth fully and in detail the construction and operation of the side bearing, the latter will be described herein only to such extent as will enable the present invention to be fully understood, reference being made to said patent for a more complete description of the side bearing.

The invention consists in the matters hereinafter described, and more particularly pointed out in the appended claims, and the same will be readily understood from the following description, reference being had to the accompanying drawings, in which—

Figure 2:
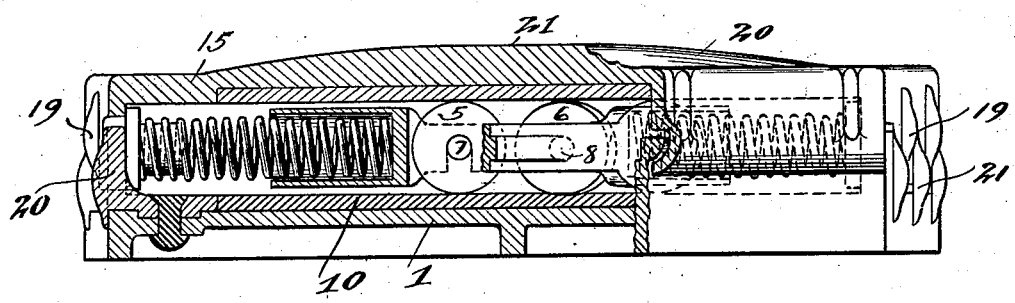

Figure 1 is a plan view with one end of the reciprocating bearing-plate broken away to expose the arrangement of the antifriction-rollers thereunder; and Fig. 2 is a view, partly in central longitudinal section and partly in side elevation, of the devices shown in Fig. 1.

Referring to said drawings, 1 designates as a whole a box-shaped base member provided with suitable lugs 2, whereby it may be bolted to the top of a car-bolster, said base member having the form of an open-topped oblong and approximately rectangular box, curved, however, throughout its length to conform to the arc of oscillation of that part of the bolster upon which it is mounted. Within said base member is arranged a roller-carriage 3, constructed to receive three longitudinally-arranged series of roller elements, respectively designated 4, 5, and 6, the two outer sets preferably each comprising four rollers, while the intermediate set 6 comprises two rollers only. The roller elements are mounted on a series of transversely-extending shafts, as 7 8, mounted in a carriage 3, to extend radially with reference to the axis of the car-bolster. The several roller elements rest in travel directly upon the floor 10 or base of the box. The carriage is suitably guided to follow the curvature of the box, and in order that the carriage may tend to travel naturally in the curved path described the several roller elements are made slightly conical. In order to center the carriage relatively to the bearing-box, a pair of coiled expansion-springs, as 13 13', is provided, one at each end of the carriage, and severally arranged with their axes extended substantially in line with the line of travel of the carriage, one end of each spring being arranged to abut against the proximate end of the carriage and the opposite end against a bearing-plate 14, which, as will hereinafter appear, is caused to travel with the bearing plate or cover 15 of the bearing. The bearing-plates 14 are constructed to fit easily at their ends between the side walls of the bearing-box, and in order that they may move with the top bearing-plate 15 the latter is provided at each end with depending lugs 19, which overlap the outer surfaces of the corresponding spring-supporting bearing-plates.

The top plate 15, the construction of which constitutes the salient feature of the present invention, is desirably made coextensive with the bearing-box and is provided at each side with confining-flanges 16 of undercut construction, which engage and slide upon correspondingly-shaped ribs 17, formed upon the upper margins of the side walls of the box, whereby the bearing-plate is held against lifting up, while permitted to reciprocate freely over the box. The end walls of the base portion of the bearing-box are provided with upstanding portions or lugs, as 20 21, which interfit with the depending portions 19 of the top plate and serve to arrest and limit the movement of the spring-supporting plates 14, and thus tend to arrest both the carriage and top plate when the latter reach centered positions.

It will be understood from the foregoing that the bearing-plate 15 is so interconnected with the roller-carriage upon which it is mounted, through the medium of the spring-supporting plates 14 and the springs 13 and 13', that while free to reciprocate in either direction the constant tendency of the springs is to center the roller-carriage and the bearing-plate. It will be further understood that in the travel of the bearing-plate back and forth its ends will move beyond or into overhanging relation to the base or fixed member.

The particular feature of improvement in the present invention consists in providing the bearing-plate with a convex or "turtle-back" shaped upper surface to receive the weight of the car-body, this convex portion being indicated at 20. As shown clearly in the two figures of the drawings, the convex portion is approximately oval in outline and is approximately coextensive with the length of that portion of the plate which is always above the supporting-base. The object of making the raised portion of this form is to prevent the weight of the car-body coming almost entirely upon any one point of the antifriction-carriage or series of rollers. It will be understood that the under surface of the car-body is usually provided with a bearing-plate or flat surface, which engages the upper side of the bearing-plate 15, and it will be obvious that with the crowning construction shown the weight brought thereon will be distributed over the set of rollers much more uniformly than would be the case were this supporting-plate substantially flat at its upper side, as shown in the prior patent hereinbefore referred to. Furthermore, by making the plate convex it will be obvious that the car-body will always come into bearing with the central portion only of the bearing-plate 15, and it will therefore be impossible to subject said plate to the weight of the car-body at a point where it is unsupported, since the central portion of the bearing-plate will always be above the set of rollers. In order to prevent the convex portion of the bearing-plate from disfiguring or denting the plate or bearing-surface upon the car-body which contacts therewith, I preferably provide a small flattened portion 21 at the apex of the convex portion, as indicated clearly in the two figures of the drawings.

It will be understood from the foregoing that with a side bearing constructed as described the antifriction-rollers will be effectually protected against crushing, since it will be impossible for the weight of the car-body to come at any time principally upon a single roller, as it will and does with a side bearing of the usual construction. When it is considered that in practice the side bearings are subjected to enormous pounding action, the importance of this construction becomes more apparent, and it is further to be noted that the distribution of the weight brought suddenly upon the bearing-plate over the entire set of antifriction-rollers prevents the rollers from becoming flattened, and thus practically inoperative or disfigured to such an extent that they no longer roll freely. The distribution of the weight of the car is due to the fact that the convexity of the surface of the bearing-plate with which the car-body contacts permits the plate to adjust itself to the rollers regardless of the angle which the contacting part of the car-body bears thereto.

I claim—

1. In a side bearing for cars, the combination of a base member, a bearing-plate mounted to reciprocate over said base member, and an interposed antifriction device, the surface of the bearing-plate which contacts with the opposed part of the car being convexly curved in a direction transverse to a radius extending therethrough from the truck-center, and from each end to an apex at the center thereof, for the purpose set forth.

2. In a side bearing for cars, the combination of a base member, a bearing-plate mounted to reciprocate over said base member, and a set of interposed antifriction-bearings supporting the bearing-plate at a plurality of points, the surface of the bearing-plate opposite that which engages the antifriction device being convexly curved in a direction parallel with the direction of travel of the bearing-plate upon the antifriction-bearings, and from a central apex downwardly to a point out of range of contact with the car-body.

3. In a side bearing for cars, the combination of a base member, a bearing-plate mounted to reciprocate upon the base member and having interengaged sliding connections therewith, a set of antifriction-rollers interposed between the bearing-plate and base member, and means acting to automatically center the bearing-plate with relation to the base, the surface of the bearing-plate opposite that which engages the antifriction-bearings being convexly curved from a central apex downwardly toward the ends of the bearing-plate, and to a point beyond the range of contact of the car-body therewith.

4. In a side bearing for cars, the combination of a bearing-plate, a bearing-surface over which said bearing-plate is arranged to reciprocate, and an interposed antifriction device, the surface of said bearing-plate remote from the antifriction engaging surface thereof being convex both longitudinally and transversely.

5. In a side bearing for cars, the combination of a base member, a bearing-plate mounted to reciprocate over said base member, and a set of interposed antifriction-bearings supporting the bearing-plate at separated points along its line of principal movement, the surface of the bearing-plate opposite that which engages the antifriction devices being made convex both transversely and longitudinally, for the purpose set forth.

6. In a side bearing for cars, the combination with a base and a bearing-plate mounted to reciprocate across said base and having a bearing engagement with the base of limited area, said bearing-plate being provided at its side remote from the base with a central elevated bearing-surface or apex, whereby the bearing stress brought upon said plate is transmitted to the base member in an equalized manner, substantially as described.

HENRY D. LAUGHLIN.

Witnesses:
ALBERT H. GRAVES,
FREDERICK C. GOODWIN.